Aug. 22, 1961  H. B. MORRIS  2,997,100
PNEUMATIC FOAM STRUCTURES
Filed June 9, 1958
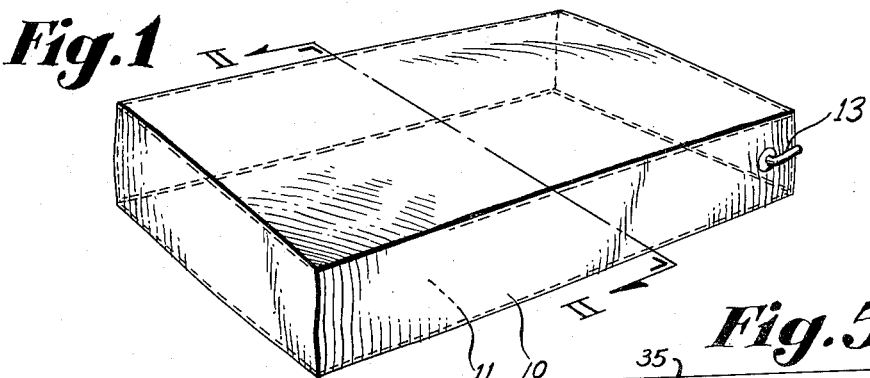
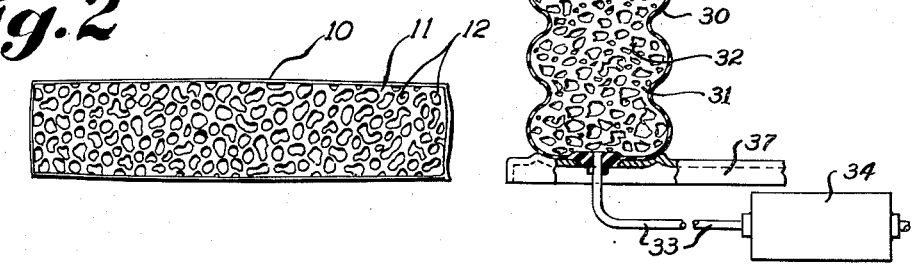
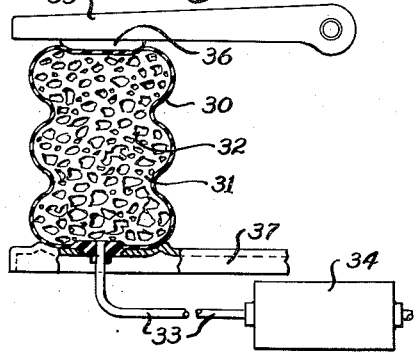
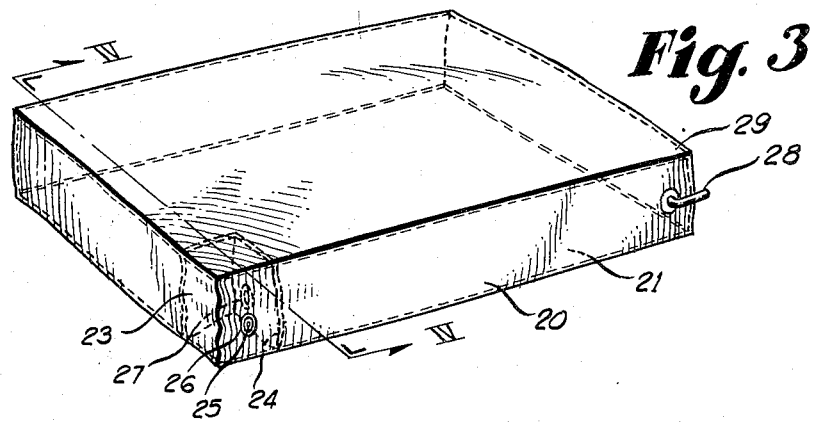
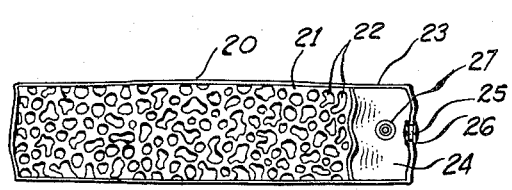
INVENTOR.
HAROLD B. MORRIS
BY HIS ATTORNEYS

United States Patent Office 2,997,100
Patented Aug. 22, 1961

2,997,100
PNEUMATIC FOAM STRUCTURES
Harold B. Morris, Latrobe, Pa., assignor to Toyad Corporation, Latrobe, Pa., a corporation of Pennsylvania
Filed June 9, 1958, Ser. No. 740,810
5 Claims. (Cl. 5—348)

This invention relates to pneumatic foam structures and particularly to a novel combination of a flexible cellular structure with a flexible envelope. Flexible cellular structures such as foam rubber have for a considerable length of time been used as weight supporting members. For example, foam rubber has been used in mattresses, pillows, seat cushions and like weight supporting members. It is highly desirable in such structures to provide different degrees of firmness for differing loads or, in the case of mattresses and the like, for different personal preferences in firmness of the weight supporting member. In order to provide this varying firmness, it has been necessary to make differing foam compositions for each degree of firmness or for each load condition and to treat the material in such a way as to attain these varying degrees of fixed firmness. In each case in the past, a weight supporting member of a given degree of firmness could not be adjusted and if a different degree of firmness of weight supporting character were desired, it was necessary to replace the weight supporting member. For example, a mattress satisfactory for a 100-lb. person would be much too soft for a 200-lb. person and each would require a separate mattress made to a different degree of firmness.

The present invention provides a pneumatic structure which overcomes these deficiencies of prior foam structures and yet retains the highly desirable even, overall support which characterizes the foam structure as compared with an ordinary pneumatic structure. The invention also provides a combination of elements which provides a measure of safety in load-bearing applications where pneumatic structures are subject to destruction by perforation through wear or by puncture. In the element of the present invention there is no instantaneous collapse upon perforation but continuous support at all times even though there may be a lessening of the support and a slump below the normal supported level. This factor in certain applications may save the loss of expensive equipment or even the loss of life. Moreover, the structure has peculiar properties for shock and vibration attenuation. For example, a thin pneumatic foam sheet presents pneumatic resistance to sudden small area impacts which is followed immediately by the cushioning action which is normally inherent in foam. Upon release of the load, the distorted area recovers to its normal position at a rate which is controlled by porosity and pressure in the structure.

In a preferred form of my invention, I provide a foamed cellular elastomer surrounded by a preformed flexible envelope relatively impervious to fluid materials and means for introducing a controlled and variable fluid pressure in the foamed cellular structure within the envelope. Preferably, valve means are provided in the outer envelope through which fluid may be introduced from a source of fluid under pressure. I may, however, provide a built-in bellows type pump in the structure itself as, for example, in one corner of a mattress within easy reach of a reclining person.

In the foregoing description, I have set out certain objects, purposes and advantages of this invention. Other objects, purposes and advantages will be apparent from a consideration of the accompanying drawings showing certain preferred embodiments of my invention.

FIGURE 1 is an isometric view of a pneumatic foam member according to my invention.

FIGURE 2 is a segmental section on the line II—II of FIGURE 1.

FIGURE 3 is an isometric view of a second embodiment of my invention.

FIGURE 4 is a section on line IV—IV of FIGURE 3.

FIGURE 5 is a vertical section through a suspension member according to the invention.

Referring to the drawings, I have illustrated an outer shell or envelope 10 formed of a preformed flexible, relatively gas impermeable material such as rubber. The envelope 10 is filled with and bonded to formed foam 11 with inter-connecting cells 12. An air valve 13 is provided in the shell or envelope 10 through which fluid such as air may be introduced into the foam to vary the resistance of the foam to compression. In this way, each cell of the foam is a separate pneumatic member whose pressure may be controlled. As a result, the entire member has the even supporting qualities of conventional foam but with regulatable firmness and weight supporting characteristics.

In the embodiment shown in FIGURES 3 and 4 I have illustrated an outer preformed, relatively impervious shell or envelope 20 of flexible material filled with and bonded to formed foam 21 having inter-connecting cells 22. In one corner 23 of the structure there is provided a bellows pump 24 opening to the atmosphere through a line 25 having a conventional check valve 26. The bellows discharges into the interior of the envelope 20 through a check valve 27. A valve 28 is provided in another corner 29 of the structure. The pressure in the structure may be released through this valve 28 or may be increased by means of the bellows pump 24.

In the embodiment shown in FIGURE 5, I have illustrated a suspension member made up of a bellows shaped outer shell 30 of flexible material, filled with and bonded to a formed foam core 31 having interconnecting cells 32. A fluid inlet 33 communicates with the cells 32 at one end and at the other end with a pressure reservoir 34. A load suspension arm 35 bears on a cap 36 on one end of the suspension member. The opposite end of the suspension member rests on a supporting arm 37. This structure is suitable for the suspension of a wheeled vehicle or like load.

The structures shown in FIGURES 1 through 5 may be formed in various ways. For example, the envelope may be preformed and filled by foaming a flexible elastomer such as polyurethane with the envelope, preferably within a mold. When formed in this fashion, good, integral adhesion between the foamed cellular structure and the outer envelope is obtained. Alternatively, the cellular structure may be preformed and then covered with sheet material which is sealed or cemented to form an envelope. Still a third way in which the structure of this invention may be formed is coating the preformed cellular structure by spraying, dipping or like means with a liquid elastomer and then drying, curing, hardening, fusion, thermosetting or whatever step is dictated by the type of coating to form a continuous envelope relatively impervious to gas.

While I have illustrated and described certain preferred embodiments of my invention in the foregoing specification and in the drawings it will be understood that the invention may be otherwise embodied within the scope of the following claims.

I claim:

1. A pneumatic foam weight supporting structure comprising an outer relatively gas impervious flexible envelope, a formed foam elastomer having interconnecting cells within said envelope and attached thereto over a substantial surface area thereof and means in the gas impervious envelope communicating with the foam elastomer whereby fluid pressure within the foam may be selectively regulated.

2. A pneumatic foam weight supporting structure comprising an outer relatively gas impervious flexible envelope, a formed foam elastomer having interconnecting cells within said envelope and attached thereto over a substantial surface area thereof and valve means in the gas impervious envelope communicating with the foam elastomer whereby gas pressure within the foam may be selectively regulated.

3. A pneumatic foam weight supporting structure comprising an outer relatively gas impervious flexible envelope, a formed foam elastomer having interconnecting cells within said envelope and attached thereto over a substantial surface area thereof, bellows means in said envelope communicating with the interior thereof and adapted to pump air from outside the envelope into the foam elastomer and valve means in the envelope adapted to release air from the foam elastomer to the atmosphere.

4. A mattress comprising an outer relatively gas impervious flexible envelope, a formed foam elastomer having inter-connecting cells within said envelope and attached thereto over a substantial surface area thereof and means in the gas impervious envelope communicating with the foam elastomer whereby gas pressure within the foam may be selectively regulated.

5. A pneumatic foam weight supporting structure comprising an outer preformed relatively gas impervious elastomer envelope, an elastomer foamed within said envelope having inter-connecting cells and adhering thereto over substantially the entire surface thereof and a selected fluid pressure in said foamed elastomer and means in the relatively gas impervious envelope communicating with the foam elastomer whereby fluid pressure within the foam may be selectively regulated.

References Cited in the file of this patent

UNITED STATES PATENTS

| | | |
|---|---|---|
| 1,332,933 | Sylvester | Mar. 9, 1920 |
| 1,908,682 | Bronson | May 16, 1933 |
| 2,686,006 | Hasselquist | Aug. 10, 1954 |
| 2,748,399 | Rockoff | June 5, 1956 |
| 2,750,606 | Freedlander et al. | June 19, 1956 |
| 2,803,023 | Rosenberg et al. | Aug. 20, 1957 |
| 2,822,554 | Wenzelberger | Feb. 11, 1958 |
| 2,834,970 | Nappe | May 20, 1958 |
| 2,886,834 | Gilbertson | May 19, 1959 |